United States Patent
Watanabe et al.

(10) Patent No.: US 8,328,345 B2
(45) Date of Patent: Dec. 11, 2012

(54) METHOD OF NON-AQUEOUS INKJET COMPOSITE PRINTING AND INK SET

(75) Inventors: Yoshifumi Watanabe, Ibaraki-ken (JP); Akiko Yamamoto, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 31 days.

(21) Appl. No.: 13/163,269

(22) Filed: Jun. 17, 2011

(65) Prior Publication Data

US 2012/0001979 A1 Jan. 5, 2012

(30) Foreign Application Priority Data

Jul. 5, 2010 (JP) .................. P2010-152828

(51) Int. Cl.
*G01D 11/00* (2006.01)
(52) U.S. Cl. ............................................. 347/100
(58) Field of Classification Search .......... 347/20, 347/95, 100; 106/31.86; 524/88, 317
See application file for complete search history.

(56) References Cited

U.S. PATENT DOCUMENTS

| | | |
|---|---|---|
| 8,022,117 B2 * | 9/2011 | Deroover et al. ............ 523/160 |
| 2009/0281219 A1 | 11/2009 | Watanabe et al. |
| 2011/0190427 A1 * | 8/2011 | Isobe et al. .................. 524/88 |

FOREIGN PATENT DOCUMENTS

JP 2009-270061 A 11/2009

* cited by examiner

*Primary Examiner* — An Do
(74) *Attorney, Agent, or Firm* — Nath, Goldberg & Meyer; Jerald L. Meyer; Tanya E. Harkins

(57) ABSTRACT

A method of forming a dense image in non-aqueous inkjet composite printing wherein a black ink and at least one color ink are ejected in the same printing scan, comprising the step of:

using the black ink comprising a pigment, a pigment dispersant, and a solvent, wherein an acid value of the pigment ($P_A$), a base value of the pigment ($P_B$), an acid value of the pigment dispersant ($D_A$), and a base value of the pigment dispersant ($D_B$), all measured by using a glass electrode as an indicator electrode and a silver/silver chloride electrode as a reference electrode, satisfy the following formula (1):

$$|W_P \Delta_P + W_D \Delta_D| < 3.0 \tag{1}$$

wherein $\Delta_P = P_A - P_B$; $\Delta_D = D_A - D_B$; $W_P$ represents the pigment content in % by mass in the ink; $W_D$ represents the pigment dispersant content in % by mass in the ink; and the unit of $P_A$, $P_B$, $D_A$, and $D_B$ is meq/g.

6 Claims, No Drawings

METHOD OF NON-AQUEOUS INKJET COMPOSITE PRINTING AND INK SET

CROSS REFERENCE TO RELATED APPLICATIONS

This Application is based upon and claims the benefit of priority from Japanese Patent Applications No. 2010-152828 filed on Jul. 5, 2010, the entire contents of which are incorporated by reference herein.

FIELD OF THE INVENTION

The present invention relates to a method of non-aqueous inkjet composite printing, specifically to a method of forming a dense image of the composite black on plain paper by adjusting acid and base values of a black ink, and by adjusting the potential difference between the black ink and a cyan ink. The present invention relates also to an ink set used for the non-aqueous inkjet composite printing.

BACKGROUND OF THE INVENTION

To increase printed image density in ink jet printing, so-called composite printing method is used where at least one color ink is ejected to a part of a recording medium to be printed in black in the same printing scan as that of a black ink so as to at least a part of the color image overlaps with the black image on the recording medium to form an image called "composite black."

A drawback with the composite black is that image density is sometimes rather reduced due to the black ink seemingly overlaid with color ink. To solve this problem, the present inventors have provided a method of using a combination of a black ink comprising a copolymer of vinylpyrrolidone and a C10-14 alkene as a pigment dispersant and a cyan ink comprising a nitrogen-containing polymer grafted with polyester side chains (See Japanese Patent Laid-Open No. 2009-270061).

SUMMARY OF THE INVENTION

Problems to be Solved by the Invention

The aforesaid combination of inks can form a dense image of composite black on plain paper. However, since the dispersant is limited to the copolymer, freedom in selecting and designing inks is limited. Thus, an object of the present invention is to find a more generalized method and to establish a criterion for forming a dense image of composite black on plain paper, and to provide an ink set that meets the criterion.

Means to Solve the Problems

The present inventors have found that a dense image of composite black can be formed by (1) adjusting a total of acid value and base value of a black ink to a predetermined range, and by (2) adjusting an electric potential difference between the black ink and a cyan ink to a predetermined range.

Thus, one aspect of the present invention is a method of forming a dense image in non-aqueous inkjet composite printing wherein a black ink and at least one color ink are ejected in the same printing scan, comprising the step of:

using a black ink comprising a pigment, a pigment dispersant, and a solvent, wherein an acid value of the pigment ($P_A$), a base value of the pigment ($P_B$), an acid value of the pigment dispersant ($D_A$), and a base value of the pigment dispersant ($D_B$), all measured by using a glass electrode as an indicator electrode and a silver/silver chloride electrode as a reference electrode, satisfy the following formula (1):

$$|W_P\Delta_P + W_D\Delta_D| < 3.0 \tag{1}$$

wherein $\Delta_P = P_A - P_B$; $\Delta_D = D_A - D_B$; $W_P$ represents the pigment content in % by mass in the ink; $W_D$ represents the pigment dispersant content in % by mass in the ink; and the unit of $P_A$, $P_B$, $D_A$, and $D_B$ is meq/g.

Another aspect of the present invention is an ink set used for non-aqueous inkjet composite printing, wherein a black ink and at least one color ink are ejected in the same printing scan, characterized in that the black ink comprises a pigment, a pigment dispersant, and a solvent, and an acid value of the pigment ($P_A$), a base value of the pigment ($P_B$), an acid value of the pigment dispersant ($D_A$), and a base value of the pigment dispersant ($D_B$), all measured by using a glass electrode as an indicator electrode and a silver/silver chloride electrode as a reference electrode, satisfy the above formula (1);

at least one color ink is a cyan ink; and an electric potential of the black ink ($PV_B$(mV)) and an electric potential of the cyan ink ($PV_C$(mV)) measured by using a glass electrode as an indicator electrode and a silver/silver chloride electrode as a reference electrode, satisfy the following formula (3):

$$PV_C - PV_B > 100 \tag{3}$$

Effects of the Invention

By selecting a pigment and a dispersant, and adjusting their contents in ink according to the above criterion, or by employing the present ink set that meets the criterion, a dense and sharp image of composite black can be formed on plain paper regardless of the dispersant type.

DETAILED DESCRIPTION OF THE PREFERRED EMBODIMENTS

In the composite printing of the present invention, at least one color ink selected from magenta, cyan, and yellow is used as a color ink. Preferably, the cyan ink is used for it has higher hiding power among the color inks. Although the effects of the present invention can be achieved regardless of the order of printing, the black ink is ejected preferably before the color ink.

Each ink comprises a pigment, a pigment dispersant, and an organic solvent. It is known from Shikizai, 61 [12], pp 692-698, 1988, that an acid value and a base value of a pigment and those of a pigment dispersant are used as indexes of the degree of dispersion of the pigment. On the other hand, the present invention employs the difference between an acid value and a base value as an index to improve a density of printed image. That is, the present invention employs a black ink of which pigment's acid value ($P_A$), pigment's base value ($P_B$), pigment dispersant's acid value ($D_A$), and pigment dispersant's base value ($D_B$) satisfy the following formula (1):

$$|W_P\Delta_P + W_D\Delta_D| < 3.0 \tag{1}$$

wherein $\Delta_P = P_A - P_B$; $\Delta_D = D_A - D_B$; $W_P$ represents the pigment content in % by mass in the ink; $W_D$ represents the pigment dispersant content in % by mass in the ink; and the unit of $P_A$, $P_B$, $D_A$, and $D_B$ is meq/g. The formula (1) indicates that a total of the difference between the acid and the base values of the pigment and the pigment dispersant in the ink is preferably smaller than a predetermined value, that is, the ink is preferably as neutral as possible.

Preferably, the black ink satisfies the following formula (2):

$$|W_P\Delta_P + W_D\Delta_D| < 1.0 \qquad (2)$$

The ink that is almost neutral to satisfy the formula (1) has an electric potential close to zero in the range of from −175 to +175 mV, preferably in the range of from −150 to +150 mV, to be capable of forming a dense printing image even by itself.

Commercially available carbon black includes neutral or weak acidic carbon and acidic carbon. From the storage stability viewpoint, acidic carbon having a larger amount of functional groups on its surface is preferred. Combinatory use of the acidic carbon black with a basic dispersant or an amphoteric dispersant having both acidic and basic functional groups can satisfy the formula (1), making the electric potential of the ink close to 0 mV.

When a combination of two or more pigments and pigment dispersants are used, the acid or the base value of such combination is a sum of each pigment's or dispersant's acid or base value multiplied by each pigment's or dispersant's mass fraction (%).

The acid and base values can be measured according to the method described in the aforementioned reference (Shikizai, 61 [12], pp 692-698, 1988). The base value of the pigment can be determined by weighing an amount of a pigment in a beaker, adding an aliquot of acid solution such as perchloric acid solution of known normality to the pigment, allowing the acid to react with the pigment for a predetermined period of time, and then back titrating with a base to determine an amount of the acid that have not been consumed by any base present in the pigment. The acid value can be determined by using a base solution such as tetrabutylammonium hydroxide (TBAH) solution of a known normality, and back titrating in the similar manner as used for the base value. The titration can be performed by using an automatic titrator equipped with a glass electrode as an indicator electrode and a silver/silver chloride electrode as a reference electrode. In the present invention, a potentiometric titrator, model AT-400, ex Kyoto Electronics Manufacturing Co., Ltd., was used. The acid and base values of the pigment dispersant can be directly determined by titration. In the present invention, a potentiometric titration method as used for the pigment was used.

As the pigment used in the black ink, carbon black is used such as furnace carbon black, lamp black, acetylene black, and channel black. The carbon black preferably has a primary particle size determined as an arithmetic average size by electron microscope analysis of from 15 nm to 35 nm, more preferably from 18 nm to 25 nm, and preferably has a dibutylphthalate (DBP) absorption number according to Japan Industrial Standard K6221 of from 50 cm³/100 g to 200 cm³/100 g, more preferably from 90 cm³/100 g to 150 cm³/100 g. The content of the carbon black in the black ink ranges from 1 to 20% by mass, preferably from 5 to 15% by mass from the viewpoint of printed image density and viscosity of the ink.

Examples of preferred pigment dispersant include polymer dispersants such as hydroxyl group-containing carboxylic acid esters, salts of long-chain polyaminoamides and high-molecular weight acid esters, salts of high-molecular weight polycarboxylic acids, salts of long-chain polyaminoamides and polar acid esters, high-molecular weight unsaturated acid esters, modified polyurethanes, modified polyacrylates, polyether ester anionic surfactants, naphthalenesulfonic acid-formalin condensate salts, polyoxyethylene alkyl phosphate esters, polyoxyethylene nonylphenyl ethers, polyester polyamines, and stearyl amine acetate.

Examples of commercially available dispersants include Solsperse 5000 (phthalocyanine ammonium salt type), 11200 (polyamide type), 13940 (polyester amine type), 17000, 18000 (aliphatic amine type), 22000, 24000, and 28000, all available from Lubrizol Japan Ltd.; Efka 400, 401, 402, 403, 450, 451, 453 (modified polyacrylate), 46, 47, 48, 49, 4010, and 4055 (modified polyurethane), all available from Efka CHEMICALS; Demor P, EP, Poiz 520, 521, 530, and Homogenol L-18 (high molecular weight polycarboxylic acid surfactant), all available from KAO CORPORATION; Disparlon KS-860, KS-873N4 (amine salt of high molecular weight polyester), both available from Kusumoto Chemicals Ltd.; Discol 202, 206, OA-202, and OA-600 (multi-chain high molecular weight nonionic surfactant), all available from DAI-ICHI KOGYO SEIYAKU CO., LTD; and ANTARON V216 (vinyl-pyrrolidone/hexadecene copolymer) available from ISP Japan Co. Ltd., among which polyimide type is preferred.

The pigment dispersant may be the one described in Japanese Patent Application Laid-Open No. 2010-1452 owned by the present applicant. The dispersant is composed of a copolymer of an alkyl(meth)acrylate having an alkyl group of 12 or more carbon atoms and a (meth)acrylate having a functional group capable of reacting with an amino group wherein at least a part of the functional group has been reacted with an amino alcohol.

The alkyl(meth)acrylate copolymer can be prepared by the following method: In the first step, a poly[alkyl(meth)acrylate] main chain is formed by subjecting (meth)acrylate monomers having an alkyl group of 12 or more carbon atoms to a radical polymerization according to a known method, where glycidyl(meth)acrylate is used as a co-monomer. In the second step, the poly[alkyl(meth)acrylate] having a glycidyl group is reacted with amino alcohol.

The content of the dispersant is adjusted so that the relationship with the acid and base values of the pigment in the ink satisfy the aforesaid formula (1), preferably the formula (2). Usually, the content ranges from about 1 to about 10% by mass.

As mentioned above, the black ink that satisfies the formula (1) has an electric potential ($PV_B$(mV)) ranging from −175 to +175 mV, more preferably from −150 to 150 mV. Preferably, the electric potential is lower than an electric potential of a color ink, particularly an electric potential of cyan ink ($PV_C$(mV)), to satisfy the following formula (3):

$$PV_C - PV_B > 100 \qquad (3).$$

Use of such black ink in combination with a cyan ink comprising a basic cyan pigment such as copper phthalocyanine pigment can form a composite black image with a high density. In the case where the above electric potential difference is 100 mV or smaller, including the case where $P_B \geq P_C$, the image density tends to be low as if black color is overlaid with cyan color. The reason for this is not known, but can be speculated that, in a cyan ink having an electric potential close to zero, electrostatic repulsion force among the pigments is smaller, so that the pigments settle more rapidly on the uppermost part of the paper surface due to faster agglomeration of the pigments.

More preferably, the black ink and the cyan ink satisfy the following formula (4):

$$300 > PV_C - PV_B > 100 \qquad (4).$$

If $PV_C - PV_B$ is 300 mV or larger, or in other words the electric potential $PV_B$ is too small, an image density of such black ink by itself tends to be low, so that an image density of composite black also tends to be low.

The electric potential of the ink can be measured by placing an aliquot of the ink in a beaker and measuring the electric potential thereof using a potentiometer equipped with a glass electrode as an indicator electrode and a silver/silver chloride electrode as a reference electrode like those used for the measurements of acid and base values. As an inner filling of the reference electrode, a 1M lithium chloride solution in ethanol can be used. Any potentiometer can be used, and a potentiometric titrator, model AT-400, ex Kyoto Electronics Manufacturing Co., Ltd., was used in the present invention.

By using a combination of the black ink and the cyan ink satisfying the formula (3), a composite black image with a high density can be formed without causing cyan color to overlay black color. As for yellow and magenta inks, any yellow ink and magenta ink may be used, but those satisfying the same relationship with the black ink as the cyan ink are preferred.

As the pigments used for the color inks, organic pigments such as azo-based pigments, phthalocyanine-based pigments, dye-based pigments, condensed polycyclic pigments, nitro-based pigments or nitroso-based pigments may be used, for example, brilliant carmine 6B, lake red C, Watchung red, disazo yellow, Hansa yellow, phthalocyanine blue, phthalocyanine green, alkali blue, and aniline black. Inorganic pigments can also be used such as oxides or sulfides of metals such as cobalt, iron, chrome, copper, zinc, lead, titanium, vanadium, manganese and nickel; yellow ocher, ultramarine, and iron blue pigments. Combination of two or more of these pigments can be used. Preferably, copper phthalocyanine blue is used for the cyan ink for it readily satisfies the above formula (3). More preferably, a nitrogen-containing copolymer having grafted polyester side chains is used as the dispersant for the cyan ink.

From the viewpoints of dispensability and storage stability, the average particle size of the pigment is preferably not larger than 300 nm, more preferably not larger than 150 nm, and most preferably not larger than 100 nm. The average particle size can be measured using a dynamic light-scattering particle size distribution measurement apparatus.

The content of the pigments in the inks ranges usually from 1 to 20% by mass, and preferably ranges from 5 to 15% by mass, from the viewpoints of image density and ink viscosity.

As pigment dispersants for the color inks, those mentioned for the black ink can be also used.

The organic solvent may be a non-polar solvent such as an aliphatic hydrocarbon solvent, an alicyclic hydrocarbon solvent and an aromatic hydrocarbon solvent, or a polar solvent such as an ester solvent and an alcohol solvent, or a mixture of these solvents both in the black and color inks.

Examples of the aliphatic hydrocarbon solvent and alicyclic hydrocarbon solvent include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Gas Exploration Co., and Isopar G Isopar H, Isopar L, Isopar M, Exxsol D40, Exxsol D80, Exxsol D100, Exxsol D130 and Exxsol D140, all manufactured by Exxon Mobil Corporation. Examples of the aromatic hydrocarbon solvents include Nisseki Cleansol G (alkylbenzene) manufactured by JX Nippon Oil & Gas Exploration Co., and Solvesso 200 manufactured by Exxon Mobil Corporation.

Examples of the ester solvent include methyl laurate, isopropyl laurate, hexyl laurate, isopropyl myristate, isopropyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethyloipropane tri-2-ethylhexanoate and glyceryl tri-2-ethylhexanoate. Examples of the alcohol solvent include isomyristyl alcohol, isopalmityl alcohol, isostearyl alcohol and oleyl alcohol. A mixture of two or more of these solvents can be used.

In addition to the aforesaid components, the ink of the present invention can comprise an optional component in such an amount that it does not adversely affect the ink. Examples of the optional component include antioxidants, viscosity modifiers, surface tension modifiers, and oxygen absorbers. Any other additives that are customarily used in this technical field may be used.

The ink can be prepared by placing the aforesaid components, and an optional component as desired in a lump or in several parts in a disperser such as a bead mill, and stirring to mix the components followed by filtering the mixture with a filter such as a membrane filter as desired.

The viscosity of the ink, though the suitable range thereof varies depending on several factors such as the diameter of ejecting head nozzles and ejecting environment, is preferably in the range of from 5 to 30 mPa·s, more preferably from 5 to 15 mPa·s, and most preferably about 10 mPa·s at 23° C. Here, the values of the viscosity are those measured at 23° C. by raising the shear stress from 0 Pa at a rate of 0.1 Pa/s to 10 Pa.

Any inkjet recording apparatus can be used such as a piezo system, an electrostatic system or a thermal system. Preferably, the piezo system is used because of its high printing speed.

EXAMPLES

Synthesis of Pigment Dispersant Resins a-d (1) A 300 ml four-neck flask was charged with 70 g of isononyl isononanoate (ININ, ex Nisshin OilliO Co.) and the temperature was raised to 110° C. under a stream of nitrogen gas while stirring. Subsequently, with the temperature maintained at 110° C., the mixture of monomers shown below was placed in the flask to which a mixture of 16.7 g of ININ and 2 g of Perbutyl 0 (t-butylperoxy-2-ethylhexanoate, ex NOF Co.) was added dropwise over 3 hours. With the temperature maintained at 110° C., an additional 0.2 g of Perbutyl 0 was added after one hour, and another 0.2 g of Perbutyl 0 after two hours.

Monomer Mixture

| | |
|---|---|
| Behenyl methacrylate | 50 g |
| Dodecyl methacrylate | 20 g |
| Glycidyl methacrylate | 15 g |
| 2-acetoacetoxyethyl methacrylate | 15 g |

(2) The reaction mixture was aged for a further one hour at 110° C., and was then diluted with 12.9 g of ININ, whereby "Resin a" with a non-volatile fraction of 50% was obtained.

"Resin b" was prepared in the similar manner as used for the preparation of "Resin a" except that 2.2 g of diethanolamine (ex Wako Pure Chemical Industries, Ltd.) was added in the step (2) and that the mixture was diluted with 15.1 g of ININ after one hour aging of the reaction mixture at 110° C.

"Resins c" and "Resin d" were prepared in the similar manner as "Resin b" except that diethanolamine was added in an amount of 5.6 g and 8.3 g, respectively.

Examples 1-6

Comparative Examples 1-4

Black or cyan ink was prepared by placing in a glass container the components according to the formulation (% by mass) shown in the upper rows of Tables 1 and 2 and zirconia beads (diameter: 0.5 mm), and then shaking with a rocking mill (Model RMO5S, ex Seiwa Technical Lab Co., Ltd.) at 65 Hz for 120 minutes followed by filtration with a 3.0-μm pore size membrane filter. Details of the components shown in Tables 1 and 2 are as follows:

MA7 (trade mark): Carbon black having a primary diameter of 24 nm, and a DBP absorption number of 60 $cm^3/100$ g, ex Mitsubishi Chemical Co.

Solsperse 11200 (trade name): Basic dispersant, ex Lubrizol Japan Ltd.

Solsperse 28000 (trade name): Basic dispersant, ex Lubrizol Japan Ltd.

S5000 (trade name): pigment derivative, ex Lubrizol Japan Ltd.

Methyl oleate, ex Kao Co.

AF6 (trade name): Naphthene solvent, ex JX Nippon Oil & Gas Exploration Co.

The following measurements ware made on the pigment, the pigment dispersant resin, and the inks prepared. Results are shown in Table 1 and Table 2 in which "Comp." stands for "Comparative."

(1) Measurements of Acid Value and Base Value
<Pigment>

In an Erlenmeyer flask, 2 g of carbon black was weighed, to which 30 ml of a $10^{-2}$ N perchloric acid solution in 4-methyl-2-pentanone was added. The carbon black was dispersed in the solution using an ultrasonic cleaner bath at 20° C. for 1 hour. The dispersion thus obtained was subjected to centrifugation, and 10 ml of the supernatant obtained was diluted with 100 ml of 4-methyl-2-pentanone. The amount of perchloric acid consumed by the carbon black was determined by back titrating the diluted supernatant with a $10^{-2}$ N sodium hydroxide solution in 2-propanol, and an amount of base per weight (meq/g) was calculated. An acid value was determined in the same manner as used for the base value except that 30 ml of a $10^{-2}$ N TBAH solution in stead of 30 ml of a $10^{-2}$ N perchloric acid solution was added to the carbon black, and back titration was performed using a $10^{-2}$ N hydrochloric acid solution in 2-propanol to determine the amount of TBAH consumed by the carbon black, from which an amount of acid per weight (meq/g) was calculated.

<Pigment Dispersant>

In 100 ml of 4-methyl-2-pentanone, 2 g of a pigment dispersant was dissolved and titrated with a $10^{-2}$ N hydrochloric acid solution in 2-propanol. The base value of the dispersant was determined from the amount of the hydrochloric acid solution required to neutralize. The acid value of the dispersant was determined by titrating with a $10^{-2}$ N sodium hydroxide solution in 2-propanol instead of a $10^{-2}$ N hydrochloric acid solution in 2-propanol, and then calculating the acid value from the amount of the sodium hydroxide solution required to neutralize.

All the titration were performed using a potentiometric titrator, model AT-400, ex Kyoto Electronics Manufacturing Co., Ltd., equipped with a glass electrode and silver/silver chloride electrode as a reference electrode.

(2) Measurement of Electric Potential

In a beaker, 50 ml of a black or cyan ink was placed, and an electric potential of the ink was measured with a potentiometric titrator, model AT-400, ex Kyoto Electronics Manufacturing Co., Ltd., equipped with a glass electrode and silver/silver chloride electrode as a reference electrode containing a 1M lithium chloride solution in ethanol as an inner filling.

(3) Printed Image Density

In an environment of a temperature of 23° C. and a humidity of 50%, solid images were printed on plain paper (Riso lightweight paper, ex Riso Kagaku Co.) by black ink printing or by composite black printing where black and cyan inks were ejected simultaneously, each printed with a discharge amount of 30 pl per dot using a piezoelectric inkjet printer head having a printing resolution of 300 dpi. A density of each image was measured by using a Macbeth reflective densitometer (RD920, ex GretagMacbeth Corporation), and then was rated according to the criteria shown below. An image density rated "C" or higher is acceptable from a practical viewpoint.

| OD value | Rating |
|---|---|
| 1.20 or larger | A |
| 1.10 or larger and smaller than 1.20 | B |
| 1.05 or larger and smaller than 1.10 | C |
| 0.95 or larger and smaller than 1.05 | D |
| Smaller than 0.95 | E |
| Tinged with blue | F |

(4) Viscosity

At a temperature of 23° C., a viscosity of each ink was measured using a controlled stress rheometer RS75, ex Haake GmbH (cone angle: 1°, diameter: 60 mm), at 10 Pa by raising the shear stress from 0 Pa at a rate of 0.1 Pa/s to 10 Pa.

TABLE 1

| | | Acid value (meq/g) | Base value (meq/g) | Example 1 | Example 2 | Example 3 | Example 4 | Example 5 | Example 6 | Cyan ink |
|---|---|---|---|---|---|---|---|---|---|---|
| Pigment | Carbon black (MA7) | 0.27 | 0.06 | 10 | 10 | 10 | 10 | 10 | 10 | |
| | Copper phthalocyanine | 0.04 | 0.14 | | | | | | | 6 |
| Pigment dispersant | S11200 | 0.25 | 1.32 | | | | | | | 2 |
| | S28000 | 0.68 | 0.61 | | | | | | | 2 |
| | Resin a | 0.18 | 0.00 | | | | | | | |
| | Resin b | 0.15 | 0.08 | 6 | 6 | | | | | |
| | Resin c | 0.10 | 0.30 | | | 6 | 6 | | | |
| | Resin d | 0.12 | 0.52 | | | | | 6 | 6 | |

TABLE 1-continued

| | | Acid value (meq/g) | Base value (meq/g) | Example 1 | Example 2 | Example 3 | Example 4 | Example 5 | Example 6 | Cyan ink |
|---|---|---|---|---|---|---|---|---|---|---|
| Synergist | S5000 | 0.00 | 0.07 | | 0.5 | | 0.5 | | 0.5 | 0.3 |
| Solvent | Methyl oleate | | | 44 | 43.5 | 44 | 43.5 | 44 | 43.5 | 43.5 |
| | AF6 | | | 40 | 40 | 40 | 40 | 40 | 40 | 40 |
| Total | | | | 100 | 100 | 100 | 100 | 100 | 100 | 93.8 |
| Ink viscosity | | mPa·sec | | 9.5 | 9.7 | 9.5 | 9.8 | 10 | 10 | 9.8 |
| Ink electric potential | | mV | | −164 | −81 | −25 | 78 | 84 | 92 | 214 |
| Electric potential difference (Cyan − Black) | | mV | | 378 | 295 | 239 | 136 | 130 | 122 | |
| Dispersant acid value × Dispersant mass % | | meq/g | | 0.89 | 0.89 | 0.59 | 0.59 | 0.72 | 0.72 | |
| Dispersant base value × Dispersant mass % | | meq/g | | 0.48 | 0.52 | 1.82 | 1.85 | 3.10 | 3.14 | |
| $W_D\Delta_D$ (=$W_D D_A - W_D D_B$) | | meq/g | | 0.41 | 0.37 | −1.23 | −1.26 | −2.38 | −2.41 | |
| Pigment acid value × Pigment mass % | | meq/g | | 2.71 | 2.71 | 2.71 | 2.71 | 2.71 | 2.71 | |
| Pigment base value × Pigment mass % | | meq/g | | 0.59 | 0.59 | 0.59 | 0.59 | 0.59 | 0.59 | |
| $W_P\Delta_P$ (=$W_P P_A - W_P P_B$) | | meq/g | | 2.12 | 2.12 | 2.12 | 2.12 | 2.12 | 2.12 | |
| $W_P\Delta_P + W_D\Delta_D$ | | meq/g | | 2.53 | 2.49 | 0.89 | 0.86 | −0.26 | −0.29 | |
| $|W_P\Delta_P + W_D\Delta_D|$ | | meq/g | | 2.53 | 2.49 | 0.89 | 0.86 | 0.26 | 0.29 | |
| Image density | Black | | | C | C | B | B | C | C | — |
| | Composite black | | | C | B | A | A | A | A | — |

TABLE 2

| | | Acid value (meq/g) | Base value (meq/g) | Comp. Example 1 | Comp. Example 2 | Comp. Example 3 | Comp. Example 4 |
|---|---|---|---|---|---|---|---|
| Pigment | Carbon black (MA7) | 0.27 | 0.06 | 10 | 10 | 10 | 10 |
| | Copper phthalocyanine | 0.04 | 0.14 | | | | |
| Pigment dispersant | S11200 | 0.25 | 1.32 | | | 6 | 6 |
| | S28000 | 0.68 | 0.61 | | | | |
| | Resin a | 0.18 | 0.00 | 6 | 6 | | |
| | Resin b | 0.15 | 0.08 | | | | |
| | Resin c | 0.10 | 0.30 | | | | |
| | Resin d | 0.12 | 0.52 | | | | |
| Synergist | S5000 | 0.00 | 0.07 | | 0.5 | | 0.5 |
| Solvent | Methyl oleate | | | 44 | 43.5 | 44 | 43.5 |
| | AF6 | | | 40 | 40 | 40 | 40 |
| Total | | | | 100 | 100 | 100 | 100 |
| Ink viscosity | | mPa·sec | | 9.6 | 9.8 | 9.8 | 9.7 |
| Ink electric potential | | mV | | −230 | −175 | 203 | 228 |
| Electric potential difference (Cyan − Black) | | mV | | 444 | 389 | 11 | −14 |
| Dispersant acid value × Dispersant mass % | | meq/g | | 1.08 | 1.08 | 1.53 | 1.53 |
| Dispersant base value × Dispersant mass % | | meq/g | | 0.00 | 0.04 | 7.94 | 7.94 |
| $W_D\Delta_D$ (=$W_D D_A - W_D D_B$) | | meq/g | | 1.08 | 1.05 | −6.42 | −6.42 |
| Pigment acid value × Pigment mass % | | meq/g | | 2.71 | 2.71 | 2.71 | 2.71 |
| Pigment base value × Pigment mass % | | meq/g | | 0.59 | 0.59 | 0.59 | 0.59 |
| $W_P\Delta_P$ (=$W_P P_A - W_P P_B$) | | meq/g | | 2.12 | 2.12 | 2.12 | 2.12 |
| $W_P\Delta_P + W_D\Delta_D$ | | meq/g | | 3.20 | 3.17 | −4.30 | −4.30 |
| $|W_P\Delta_P + W_D\Delta_D|$ | | meq/g | | 3.20 | 3.17 | 4.30 | 4.30 |
| Image density | Black | | | D | D | E | E |
| | Composite black | | | D | D | F | F |

As can be found from Tables 1 and 2, the black inks of Comparative Examples 1-4, which failed to satisfy the formula (1) in the present invention, showed low image density, and the composite black images of the black inks of Comparative Examples 3 and 4 in particular were tinged with blue as if black color was overlaid with cyan color. In contrast, the images of the Examples showed high density both in black printing and composite black printing, and those of Examples 3 to 6, of which inks satisfied the formula (4), particularly showed significantly high density.

As mentioned above, by selecting inks according to the present method, a composite black image with a high density can be formed in non-aqueous inkjet printing.

It should be noted that, besides those already mentioned above, various modifications and variations can be made in the aforementioned embodiments without departing from the novel and advantageous features of the present invention. Accordingly, it is intended that all such modifications and variations are included within the scope of the appended claims.

The invention claimed is:

1. A method of forming a dense image in non-aqueous inkjet composite printing wherein a black ink and at least one color ink are ejected in the same printing scan, comprising the step of:

using the black ink comprising a pigment, a pigment dispersant, and a solvent, wherein an acid value of the pigment ($P_A$), a base value of the pigment ($P_B$), an acid value of the pigment dispersant ($D_A$), and a base value of the pigment dispersant ($D_B$), all measured by using a glass electrode as an indicator electrode and a silver/silver chloride electrode as a reference electrode, satisfy the following formula (1):

$$|W_P\Delta_P + W_D\Delta_D| < 3.0 \qquad (1)$$

wherein $\Delta_P=P_A-P_B$; $\Delta_D=D_A-D_B$; $W_p$ represents the pigment content in % by mass in the ink; $W_D$ represents the pigment dispersant content in % by mass in the ink; and the unit of $P_A$, $P_B$, $D_A$, and $D_B$ is meq/g.

2. The method according to claim 1, wherein the black ink satisfies the following formula (2):

$$|W_P\Delta_P+W_D\Delta_D|<1.0 \tag{2}$$

3. The method according to claim 1, wherein at least one color ink is a cyan ink, and an electric potential of the black ink ($PV_B$ (mV)) and an electric potential of the cyan ink ($PV_C$ (mV)), both measured by using a glass electrode as an indicator electrode and a silver/silver chloride electrode as a reference electrode, satisfy the following formula (3):

$$PV_C-PV_B>100 \tag{3}$$

4. The method according to claim 3, wherein the electric potential of the black ink ($PV_B$(mV)) and the electric potential of the cyan ink ($PV_C$(mV)) satisfy the following formula (4):

$$300>PV_C-PV_B>100 \tag{4}$$

5. An ink set used for non-aqueous inkjet composite printing, wherein a black ink and at least one color ink are ejected in the same printing scan, characterized in that
the black ink comprises a pigment, a pigment dispersant, and a solvent;
an acid value of the pigment ($P_A$), a base value of the pigment ($P_B$), an acid value of the pigment dispersant ($D_A$), and a base value of the pigment dispersant ($D_B$), all measured by using a glass electrode as an indicator electrode and a silver/silver chloride electrode as a reference electrode, satisfy the following formula (1):

$$|W_P\Delta_P+W_D\Delta_D|<3.0 \tag{1}$$

wherein $\Delta_P=P_A-P_B$; $\Delta_D=D_A-D_B$; $W_p$ represents the pigment content in % by mass in the ink; $W_D$ represents the pigment dispersant content in % by mass in the ink; and the unit of $P_A$, $P_B$, $D_A$, and $D_B$ is meq/g;
at least one color ink is a cyan ink; and
an electric potential of the black ink ($PV_B$(mV)) and an electric potential of the cyan ink ($PV_C$(mV)), both measured by using a glass electrode as an indicator electrode and a silver/silver chloride electrode as a reference electrode, satisfy the following formula (3):

$$PV_C-PV_B>100 \tag{3}$$

6. The ink set according to claim 5, wherein the electric potential of the black ink ($PV_B$(mV)) and the electric potential of the cyan ink ($PV_C$(mV)) satisfy the following formula (4):

$$300>PV_C-PV_B>100 \tag{4}$$

* * * * *